Figure 1:
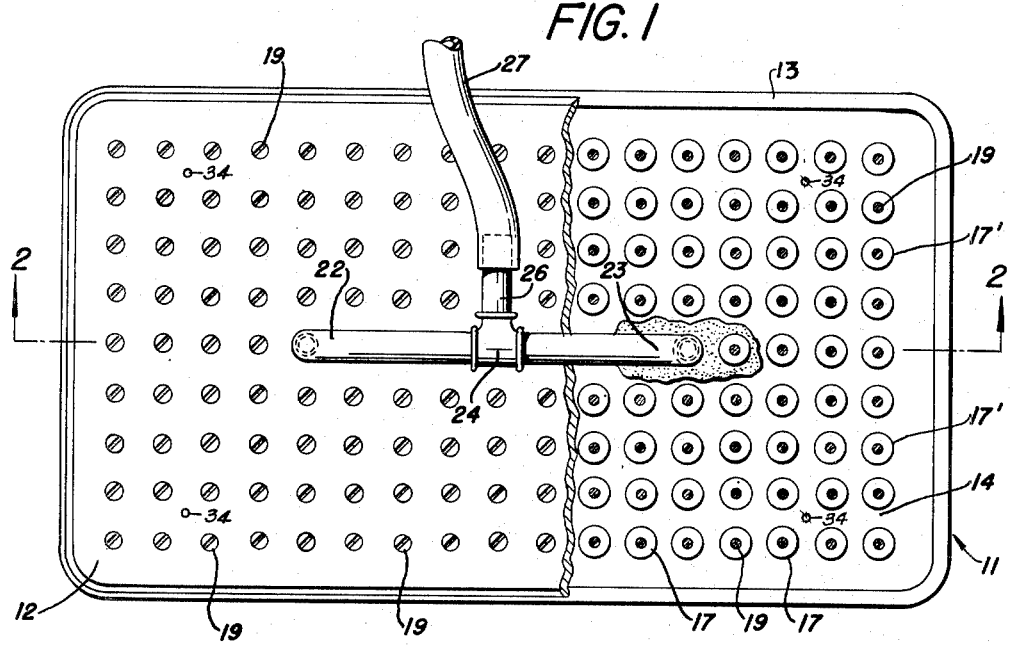

Jan. 25, 1955 R. W. BLAKE 2,700,178
INJECTION MOLDING OF FOAMED LATEX
Filed April 6, 1951

INVENTOR.
ROBERT W. BLAKE
BY
ATTORNEYS

United States Patent Office

2,700,178
Patented Jan. 25, 1955

2,700,178

INJECTION MOLDING OF FOAMED LATEX

Robert W. Blake, Assonet, Mass., assignor to The Firestone Tire & Rubber Company, Akron, Ohio, a corporation of Ohio Application April 6, 1951, Serial No. 219,748

6 Claims. (Cl. 18—30)

This invention relates to the molding of foamed rubber articles, and particularly to injection molding of articles having tubular cavities, such as auto seat cushions. While the invention is shown and described for the molding of foamed latex articles, it may be adapted to the molding of other articles from a fluid casting material which is molded in a closed molding chamber.

Heretofore, such articles have been formed by squirting the foamed latex into the lower section of the mold, scraping off excess latex, and applying a cover having, on its under side, downwardly extending pins with domed ends.

The pouring and scraping, which must take account of volume displacement of the pins, required the full time of two workmen and required estimation on their part which was erratic at best and resulted in waste material.

According to the present invention, the mold sections are first secured together and the latex is then introduced, under pressure, through one or more pipes which are substituted for conventional pins on the cover and which have dome-shaped rubber elements on their lower ends, slitted to function as check valves. By this arrangement, one workman can do the work of two; there is no waste; much time is saved; and the formed product, being under pressure, has a finer and more uniform texture and generally improved physical characteristics.

It is therefore an object of the invention to provide economies in the formation of foamed rubber articles. Another object is to improve the quality of such articles and provide uniformity of quality throughout each article and among the articles severally. A still further object is to provide for injection molding of articles of the type having open cavities, using existing mold elements for injection.

Figure 2:
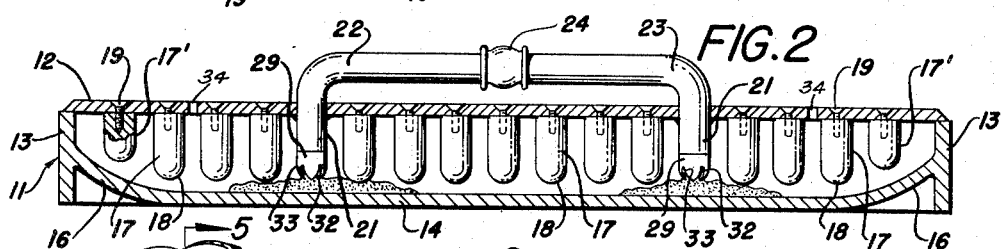
Figure 3:
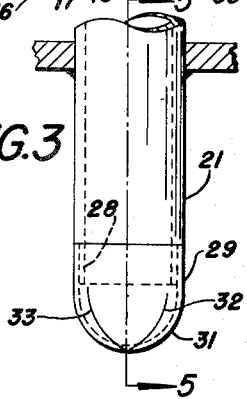
Figure 5:
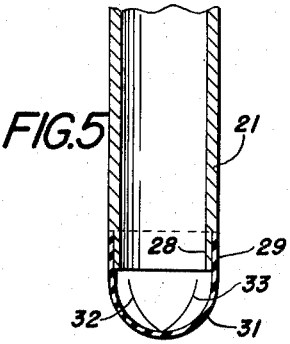
Figure 6:
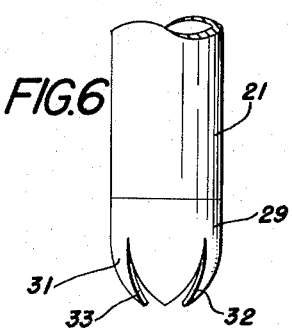
Figure 4:
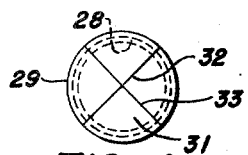

These and other ends are attained by the invention, one preferred form of which is described in the following specification and illustrated in the drawings, in which:

Fig. 1 is a top plan view of a portion of a mold assembly, with the top or cover section partly broken away, Fig. 2 is a sectional view taken on the line 2—2 of Fig. 1, Fig. 3 is an enlarged elevational view of a detail, showing one of the injection tubes and its end valve, Fig. 4 is a bottom plan view of Fig. 3, Fig. 5 is a sectional view taken on the line 5—5 of Fig. 3, and Fig. 6 is a view similar to Fig. 3, showing the domed check valve in open condition.

Referring to the drawings by characters of reference, and particularly Fig. 2, there is shown a mold assembly of generally conventional structure, used in the making of so-called "topper" pads for automobile seats. The mold assembly comprises a lower mold section 11 and a tight fitting cover 12. As understood in the art, the cover may be hinged to the lower section and suitable locking means for the assembly are provided. However, these have no essential bearing on the present invention and therefore have been omitted from the drawing for the sake of clarity.

Lower section 11 has a vertical wall 13 arranged in generally rectangular form, with rounded corners, and the bottom portion 14 has upwardly sloped marginal zones 16.

Depending from the lower side of cover 12 are a plurality of pins 17 with hemi-spherical bottom ends 18. Preferably these are arranged in aligned fashion in rows and columns for the sake of appearance, as well as uniform cushioning performance. The outer series of pins 17' are somewhat shorter than the inner pins because of the slopes 16 of the bottom. As shown, the pins are secured to the cover by screws 19, but obviously they may be secured in any convenient manner, as by welding for instance.

The injection of the foamed latex is effected through hollow pins or tubes which are substituted, at suitable locations, for the pins 17. Two such tubes, numbered 21, 21 are shown in Figs. 1 and 2. These are permanently secured in any suitable manner in openings in the cover so as to extend both above and below the cover. Any suitable arrangement for conducting the foamed rubber to the tubes may be employed. As shown, the tubes have bent portions 22, 23, secured to a T fitting 24. A length of pipe 26 in the third opening of the T fitting is adapted to receive a hose 27 connected to the supply of latex under pressure (not shown).

In order to prevent escape of the contents of the mold during the subsequent steps of the process, it is desirable to provide a check valve to prevent return of the material up a tube 21. This check valve should preferably be located at the extreme end of the tube so that the cavity formed thereby will be the same as the cavities formed by the other pins. In the preferred form and as best seen in Fig. 5, the tubes 21, 21 have a lower end 28 of reduced diameter, on which is secured, as by cementing or other suitable means, a rubber tube 29 having a domed bottom 31 identical with domed ends 18 of the conventional pins 17 and forming a continuation of the tube 21. Tubes 21, 21 also correspond in diameter to pins 17.

As best seen in Fig. 4, the domed bottom 31 of the rubber cap has crossed slits 32, 33.

Under conditions of continuous production, the mold assembly is brought to position at the latex feeding station and hose 27 is slipped onto pipe 26. The latex under pressure, when released by suitable means, passes through the manifold 26, 22—23, 21—21, forces open slits 32, 33 in the rubber cap, as seen in Figs. 2 and 6, and is distributed throughout the mold. When the mold is full, the pressure supply is turned off and upon removal of hose 27, the pressure within the mold closes slits 32, 33 and the mold pressure is effectively retained by the rubber cap. Due to the domed structure of the cap, it effectively resists collapse. For venting the air in the mold during the pressure charging, a restricted orifice is provided at a convenient location, in the top of the mold for instance as shown at 34. This will permit the forcing out of air, but provide relatively high resistance to passage of the much more viscous foamed latex, so that pressure is maintained in the mold. Also, the mold sections may be provided with gaskets, in which case a small portion of the gasket may be omitted, for venting.

It will be seen that with the arrangement described, effective use is made of a mold assembly having pins with domed ends, whereby an effective check valve arrangement for injection molding is provided by a novel means substituted for existing structure, whereby a given unit performs a new and useful function while still performing its former function.

The exact pattern of the slits can be considerably varied, and many varitions of the feed conduit arrangement will suggest themselves to those skilled in the arts akin to that of the present invention.

After the mold is filled with a charge of the foamed latex, the inlet pipe 27 is disconnected and the filled molds are then subjected to the further steps in the process of making the article, which usually consists in gelling and then vulcanizing.

It will be seen that by the use of the invention, an exact charge of the foamed latex will be introduced in the mold and there is no loss from the overflow of the material when the cover is put in place, as is the usual experience where the workmen will put an excess of material in the mold as a matter of precaution so that the charge will fill out the mold. For the same reason, it is assured that there is no shortage of foamed latex.

The special pins which are used as the injection means form cavities similar to those formed by the regular pins 17.

While in the preferred form of the invention there are a plurality of pins forming a multiplicity of large chambers or air cells in the finished product, the invention may be applied to a mold in which there is only one pin or projection extending into the mold. Or it is possible, where only a few cavities are to be formed, all of the projections may be used as inlets for the material.

Generally speaking, whereas a certain preferred embodiment has been shown and described, the invention is not to be considered as limited thereby, since changes in the size, shape, character and arrangement, for instance, of the various parts may be resorted to without departing from the spirit or scope of the invention in its broad aspect.

What is claimed is:

1. For forming foamed rubber articles of the type having an array of open cavities, a mold assembly having separable sections and pins with domed, inner ends carried by one of said sections so as to extend into the mold when closed, at least one of said pins being tubular, with its interior accessible from the outside of the mold, and a resilient cap on the inner end of said one of said pins having an opening constituting a check valve to resist fluid flow outwardly of said mold.

2. For forming foamed rubber articles of the type having an array of open cavities, a mold assembly having separable sections and pins with domed, inner ends carried by one of said sections so as to extend into the mold when closed, at least one of said pins being tubular, with its interior accessible from the outside of the mold, and a resilient, domed cap on the inner end of said one of said pins having an opening constituting a check valve to resist fluid flow outwardly of said mold.

3. For forming foamed rubber articles of the type having an array of open cavities, a mold assembly having separable sections and pins with domed, inner ends carried by one of said sections so as to extend into the mold when closed, at least one of said pins being tubular with its interior accessible from the outside of the mold, and a resilient, domed cap on the inner end of said one of said pins having slits in its domed end.

4. A device for use in casting articles in a closed mold, two seperable mold sections, one of said sections having a pin projecting into the mold cavity, said pin having a passage therethrough and having connections exterior of the mold for the introduction of casting material into the mold through the pin, and a cap on the innermost end of the pin, said cap being made of a flexible material with slits therein to allow the passage of the casting material into the mold but to prevent return of the casting material through the pin.

5. For forming foamed rubber articles of the type having an array of open cavities, a mold assembly having separable sections and pins carried by one of said sections so as to extend into the mold when closed, at least one of said pins being hollow with its interior accessible from the outside of the mold and a check valve of resilient material carried by at least one of said hollow pins interiorly of said mold assembly.

6. For forming foamed rubber articles of the type having an array of open cavities, a mold assembly having separable sections and pins carried by one of said sections so as to extend into the mold when closed, at least one of said pins being hollow with its interior accessible from outside the mold and a dome shaped check valve of resilient material mounted on the end of said pin.

References Cited in the file of this patent

UNITED STATES PATENTS

| | | |
|---|---|---|
| 1,823,180 | White et al. | Sept. 15, 1931 |
| 2,308,971 | Carter | Jan. 19, 1943 |
| 2,351,529 | Luxenberger et al. | June 13, 1944 |
| 2,396,406 | Anderson | Mar. 12, 1946 |
| 2,416,506 | Vest | Feb. 25, 1947 |
| 2,574,391 | Herrly | Nov. 6, 1951 |
| 2,595,964 | Lovell | May 6, 1952 |

FOREIGN PATENTS

| | | |
|---|---|---|
| 450,243 | Great Britain | July 7, 1936 |
| 549,556 | France | Feb. 14, 1923 |